United States Patent [19]
Hiratsuka et al.

[11] Patent Number: 6,108,441
[45] Date of Patent: Aug. 22, 2000

[54] COLOR ADJUSTMENT METHOD FOR PIXELS OF COLOR IMAGES THAT DESIGNATES COLOR AND CORRESPONDING ADJUSTMENT COLORS

[75] Inventors: Seiichiro Hiratsuka, Kitakyushu; Etsuko Himoto, Fukuoka; Tadaomi Asou, Saga-ken, all of Japan

[73] Assignee: Matsushita Electric Industrial Co. Ltd., Osaka, Japan

[21] Appl. No.: 08/777,791

[22] Filed: Dec. 31, 1996

[30] Foreign Application Priority Data

Jan. 8, 1996 [JP] Japan .................................. 8-000555

[51] Int. Cl.$^7$ ......................................... G06K 9/00
[52] U.S. Cl. ............................ 382/167; 382/274
[58] Field of Search .................... 382/167, 162, 382/166, 163, 164, 274, 275; 358/518, 523, 520, 530, 525, 1.9; 345/199, 431, 154, 334, 355, 153, 150, 112; 348/391, 390, 384

[56] References Cited

U.S. PATENT DOCUMENTS

| | | | |
|---|---|---|---|
| H1506 | 12/1995 | Beretta | 345/199 |
| 5,111,286 | 5/1992 | MacDonald et al. | 358/500 |
| 5,202,935 | 4/1993 | Kanamori et al. | 382/162 |
| 5,481,655 | 1/1996 | Jacobs | 395/109 |
| 5,519,789 | 5/1996 | Etoh | 382/225 |
| 5,689,349 | 11/1997 | Plettinck et al. | 358/500 |
| 5,699,491 | 12/1997 | Barzel | 395/109 |
| 5,751,845 | 5/1998 | Dorff | 382/162 |
| 5,850,475 | 12/1998 | Kasao | 382/173 |

OTHER PUBLICATIONS

"A Method of Color Correction by Corresponding to Plural Desirable Colors", J. Ikeda et al, Proceedings of Color Forum Japan '94 , pp. 19–22, 1994.

Ikeda, Jun, "Method of Color Correction by Correspondence to Several Standard Colors", 1994, pp. 1–13.

*Primary Examiner*—Dov Popovici
*Attorney, Agent, or Firm*—Venable; Robert J. Frank; Allen Wood

[57] ABSTRACT

In a method for color adjustment of a color image, a color adjustment software window is displayed and color image data on an RGB color space before color adjustment is displayed on a before-adjustment image window of a color monitor screen. An operator for color adjustment designates a color on the before-adjustment image window (or a designated color) and sets an adjustment color for the designated color (or a designated adjustment color). The designated adjustment color is set from a color pallet or by changing the R, G and B levels of a designated-color window and color adjustment parameters for the designated color are determined from the designated color and the designated adjustment color. In performing the color adjustment of a color other than the designated color (or an interpolated color), color adjustment parameters for the interpolated color are calculated on the basis of a distance between the interpolated color and the designated color on a color space to obtain the interpolated color after color adjustment which is to be displayed on an after-adjustment image window.

28 Claims, 11 Drawing Sheets

COLOR ADJUSTMENT METHOD FOR PIXELS OF COLOR IMAGES THAT DESIGNATES COLOR AND CORRESPONDING ADJUSTMENT COLORS

BACKGROUND OF THE INVENTION

1. Filed of the Invention

The present invention relates to a color adjustment method for color-adjusting a color image for a color printer, color copying machine or the like.

2. Description of the Related Art

As a method for color adjustment of a color image have hitherto been proposed the two following systems:

(1) a system in which the color of the whole of an image to be adjusted is adjusted in reference to a specified color in the image to be adjusted; and (2) a system in which the color of a specified area (or display space area or color space area) in an image to be adjusted is adjusted.

However, the system (1) has the problem of influence on another color in the image and the system (2) has problems including the complexity of designation of the specified area, the generation of pseudo outlines and so forth.

An improvement on the systems (1) and (2) has been proposed by "A method of color correction by corresponding to plural desiable colors", Proceedings of COLOR FORUM JAPAN '94, pp. 19–22. This improved system is a color adjustment system in which a processing for the whole of an image to be adjusted is performed in such a manner that a plurality of colors in the image to be adjusted (designated colors) and colors desired to obtain after adjustment corresponding to the designated colors (adjustment colors) are given and each correspondence is extrapolated smoothly over the whole of a coordinate system in which a color adjustment processing is performed.

A procedure for color adjustment processing by the improved system includes the three following steps.

Namely, a portion having colors to be subjected to color adjustment (designated colors) is selected from an inputted image to be adjusted so that a color desired to obtain after adjustment (adjustment color) is caused to correspond to each designated color (step 1).

An extrapolation calculation on condition of the correspondence of the designated color to the adjustment color is made to define a function having output values for all input values in a coordinate system in which a color adjustment processing is performed (step 2).

The function defined by the extrapolation calculation is used to perform the color adjustment processing for all pixel data of the image to be adjusted (step 3). In actuality, inputted image data is converted to the value of the coordinate system beforehand and the adjustment processing is performed by use of a processing function. Thereafter, the data is converted again into data of a coordinate system at the time of input and the converted data is outputted.

This improved system uses, as the coordinate system for color adjustment, a L* Cuv* Huv° (hereinafter abbreviated as LHC) coordinate system defined in a CIE-L* u* v* space which is one of uniform perceptual color spaces. The color adjustment of the whole of the image is realized by performing interpolation processings with an extrapolation function of luminosity L having a preference for a chroma C direction, with an extrapolation function of chroma C having a preference for a hue H direction and with an extrapolation function of hue H having a preference for a luminosity L direction.

However, the conventional color adjustment method has the following problem. Namely, in the case where a pixel having a color near to a first designated color on a color space is to be adjusted, the color image may be color-adjusted in an undesirable direction since notwithstanding that the color of that pixel is near to the first designated color, it is affected by color adjustment parameters for a second designated color a specified axis (for example, luminosity L) of which is near to that of the first designated color.

SUMMARY OF THE INVENTION

An object of the present invention made in light of the above problem is to provide a color adjustment method in which in the case where there are a plurality of designated colors, the color of a pixel to be subjected to color adjustment is strongly affected by the nearest designated color on a color space and the color adjustment is made smoothly over the whole of the color space, whereby an operator of a color adjusting apparatus can obtain a desired color-adjusted image easily.

Another object of the present invention is to make the color adjustment of the whole and the color adjustment of each color simultaneously, thereby enabling the color adjustment to have further improved operability. A further object of the present invention is to realize a color adjustment processing by table interpolation, thereby enabling the color adjustment to operate at a high speed. A still further object of the present invention is to realize the color adjustment of the whole and the color adjustment of each color simultaneously by table interpolation, thereby enabling the color adjustment operate with a further improved operability and at a high speed.

In order to solve the above problems and to attain the above objects, the present invention provides a method of performing color adjustment with a plurality of colors being designated on a color image represented on a first color space, comprising a step of inputting color adjustment information of the plurality of designated colors when the plurality of colors are designated, a step of determining color adjustment parameters for the plurality of designated colors on a second color space from the color adjustment information of the plurality of designated colors, a step of inputting pixel color information of each pixel of the color image, a step of determining the respective distances between the pixel color information and the plurality of designated colors on a third color space, and a step of determining the color of the pixel after color adjustment on the second color space from the color adjustment parameters for the plurality of designated colors and the distances.

With the above construction, a color-adjusted color image desired by an operator is easily obtained since the color of a pixel to be subjected to color adjustment is strongly affected by the nearest designated color on a color space and the color adjustment is made smoothly over the whole of the color space.

Namely, the present invention provides the following color adjustment methods.

(1) A color adjustment method of performing color adjustment with a plurality of colors being designated on a color image represented on a first color space comprises the steps of: inputting color adjustment information of a plurality of designated colors when the plurality of colors are designated; determining color adjustment parameters for the plurality of designated colors on a second color space from the color adjustment information of the plurality of designated colors; inputting pixel color information of each pixel of the color image; determining distances between the pixel color information and the plurality of designated colors on a third color space; and determining a color of the pixel after color adjustment on the second color space from the color adjustment parameters for the plurality of designated colors and the distances.

(2) A color adjustment method of simultaneously performing color adjustment with a plurality of colors designated on a color image represented on a first color space and color adjustment as the whole of the color image comprises the steps of: inputting whole color adjustment information as the whole of the color image; inputting color adjustment information of the plurality of designated colors when the plurality of colors are designated; determining color adjustment parameters for the plurality of designated colors on a second color space from the color adjustment information of the plurality of designated colors; inputting pixel color information of each pixel of the color image; determining distances between the pixel color information and the plurality of designated colors on a third color space; and determining a color of the pixel after color adjustment on the second color space from the whole color adjustment information, the color adjustment parameters for the plurality of designated colors and the distances.

(3) A color adjustment method of performing a color adjustment of a color image represented on a first color space comprises the steps of: inputting designated colors of the color image; inputting designated-adjustment-colors for the designated colors; determining first color adjustment parameters for the designated colors on a second color space based on the designated-adjustment-colors; inputting first pixel colors of pixels in the color image; determining distances between the first pixel colors and the designated colors on a third color space; determining second color adjustment parameters for the first pixel colors based on the first color adjustment parameters and the distances; determining determining color-adjusted pixel colors of the pixels based on the second color adjustment parameters and the distances, on the second color space; converting the color-adjusted pixel colors to second pixel colors on a fourth color space; and repeating from the step of inputting first pixel colors to the step of converting the color-adjusted pixel colors for every pixel in the color image.

(4) A color adjustment method of simultaneously performing a color adjustment of a color image represented on a first color space and a color adjustment as the whole of the color image comprises the steps of: inputting first color adjustment parameters for the whole of the color image; inputting designated colors of the color image; inputting designated-adjustment colors for the designated colors; determining second color adjustment parameters for the designated colors on a second color space based on the designated-adjustment-colors; inputting first pixel colors of pixels in the color image on the first color space; determining distances between the first pixel colors and the designated colors on a third color space; determining third color adjustment parameters for the first pixel colors based on the first color adjustment parameters, the second color adjustment parameters and the distances; determining color-adjusted pixel colors of the pixels based on the third color adjustment parameters and the first pixel colors, on the second color space; converting the color-adjusted pixel colors to second pixel colors on a fourth color space; and repeating from the step of inputting first pixel colors to the step of converting the color-adjusted pixel colors for every pixel in the color image.

(5) A color adjustment method according to any one of items (1) to (4), wherein the color image is a color motion image.

(6) A color adjustment method according to any one of items (1) to (4), wherein the color image is a three-dimensional color image.

(7) A color adjustment method according to any one of items (1) to (4), wherein the color adjustment information of the designated color is inputted including a range of adjustment for the designated color.

(8) A color adjustment method according to any one of items (1) to (4), wherein the first color space is a color space including three additive primary colors of red, green and blue.

(9) A color adjustment method according to any one of items (1) to (4), wherein the second color space is a color space including luminosity, chroma and hue.

(10) A color adjustment method according to item (1) or (4), wherein the third color space is a color space including luminosity and two chromaticities.

(11) A color adjustment method according to item (3) or (4), wherein the fourth color space is a color space including three additive primary colors of red, green and blue, a color space including three subtractive primary colors of cyan, magenta and yellow, or a color space including four subtractive primary colors of cyan, magenta, yellow and black.

(12) A color adjustment method according to item (9), wherein the color adjustment parameters $\alpha$, $\beta$ and $\gamma$ for the designated color in the second color space satisfy the relations of $\alpha=l'/l$, $\beta=c'/c$ and $\gamma=h'-h$ where l, c and h are the luminosity, chroma and hue of the designated color before color adjustment and l', c' and h' are the luminosity, chroma and hue of the designated color after color adjustment.

(13) A color adjustment method according to any one of items (1) to (4), wherein the distance on the third color space is a three-dimensional Euclidean distance on the third color space.

(14) A color adjustment method according to item (1) or (4), wherein the distance on the third color space is a five-dimensional Euclidean distance on a five-dimensional space into which the third color space and the plane of the color image are united.

(15) A color adjustment method according to item (5), wherein the distance on the third color space is a four-dimensional Euclidean distance on a four-dimensional space into which the third color space and the time axis of the color motion image are united.

(16) A color adjustment method according to item (5), wherein the distance on the third color space is a six-dimensional Euclidean distance on a six-dimensional space into which the third color space and the image plane and time axis of the color motion image are united.

(17) A color adjustment method according to item (6), wherein the distance on the third color space is a six-dimensional Euclidean distance on a six-dimensional space into which the third color space and the space of the three-dimensional color image are united.

(18) A color adjustment method according to item (5) or (10), wherein the distance on the third color space is a seven-dimensional Euclidean distance on a seven-dimensional space into which the third color space and the image plane and time axis of the three-dimensional color motion image are united.

(19) A color adjustment method according to item (1) or (3), wherein a color adjustment parameter S for the color information of each pixel after color adjustment is determined on the second color space from the color adjustment parameters $S_i$ (i=1, - - -, n) for the plurality of designated colors and the distances $d_i$ (i=1, - - -, n) by the interpolation equation of $$S=\{S1\cdot f(d1)+\cdots+Sn\cdot f(dn)\}/\{f(d1)+\cdots+f(dn)\}$$

where $f(x)$ ($x \geq 0$) is a weighting function.

(20) A color adjustment method according to item (2) or (4), wherein a color adjustment parameter S for the color information of each pixel after color adjustment is determined on the second color space from the whole color adjustment information S0, the color adjustment parameters Si (i=1, - - - , n) for the plurality of designated colors and the distances di (i=1, - - - , n) by the interpolation equation of $$S=\{S0\cdot f(d0)+S1\cdot f(d1)+\cdots+Sn\cdot f(dn)\}/\{f(d0)+f(d1)+\cdots+f(dn)\}$$

where $f(x)$ ($x \geq 0$) is a weighting function.

(21) A color adjustment method according to item (7), wherein a color adjustment parameter S for the color information of each pixel after color adjustment is determined on the second color space from the color adjustment parameters Si (i=1, - - - , n) for the plurality of designated colors, the distances di (i=1, - - - , n) and the adjustment ranges qi (i=1, - - - , n) for the plurality of designated colors by the interpolation equation of $$S=\{S1\cdot f(q1/d1)+\cdots+Sn\cdot f(qn/dn)\}/\{f(q1/d1)+\cdots+f(qn/dn)\}$$

where $f(x)$ ($x \geq 0$) is a weighting function.

(22) A color adjustment method according to item (7), wherein a color adjustment parameter S for the color information of each pixel after color adjustment is determined on the second color space from the whole colora djustment information S0, the color adjustment parameters Si (i=1, - - - , n) for the plurality of designated colors, the distances di (i=1, - - - , n) and the adjustment ranges qi (i=1, - - - , n) for the plurality of designated colors by the interpolation equation of $$S=\{S0+S1\cdot f(q1/d1)+\cdots+Sn\cdot f(qn/dn)\}/\{1+f(q1/d1)+\cdots+f(qn/dn)\}$$

where $f(x)$ ($x \geq 0$) is a weighting function. (23) A color adjustment method according to any one of items (19) to (22), wherein the weighting function $f(x)$ is a monotone decreasing function in $x>0$.

(24) A color adjustment method according to item (23), wherein the weighting function $f(x)$ is $$f(x)=1/x^2.$$

(25) A color adjustment method according to item (3) or (4), wherein the predetermined color information includes three-dimensional chromaticity information of the first color space.

(26) A color adjustment method according to item (3) or (4), wherein the predetermined color information includes three-dimensional chromaticity information of the first color space and image plane coordinate information of the color image.

(27) A color adjustment method according to item (5), wherein the predetermined color information includes three-dimensional chromaticity information of the first color space and image plane coordinate information and time frame information of the color motion image.

(28) A color adjustment method according to item (6), wherein the predetermined color information includes three-dimensional chromaticity information of the first color space and image space coordinate information of the three-dimensional color image.

(29) A color adjustment method according to item (5) or (6), wherein the predetermined color information includes three-dimensional chromaticity information of the first color space and image space coordinate information and time frame information of the color image.

(30) A color adjustment method according to item (3) or (4), wherein in the case where the color information of the pixel after color adjustment is determined on the fourth color space from the plurality of predetermined color information after color adjustment stored, the determination is made using a multi-dimensional table interpolation method and the predetermined color information after color adjustment is data of a multi-dimensional table.

DESCRIPTION OF THE PREFERRED EMBODIMENTS

A first embodiment of the present invention will now be explained in reference to the drawings.

Figure 1:
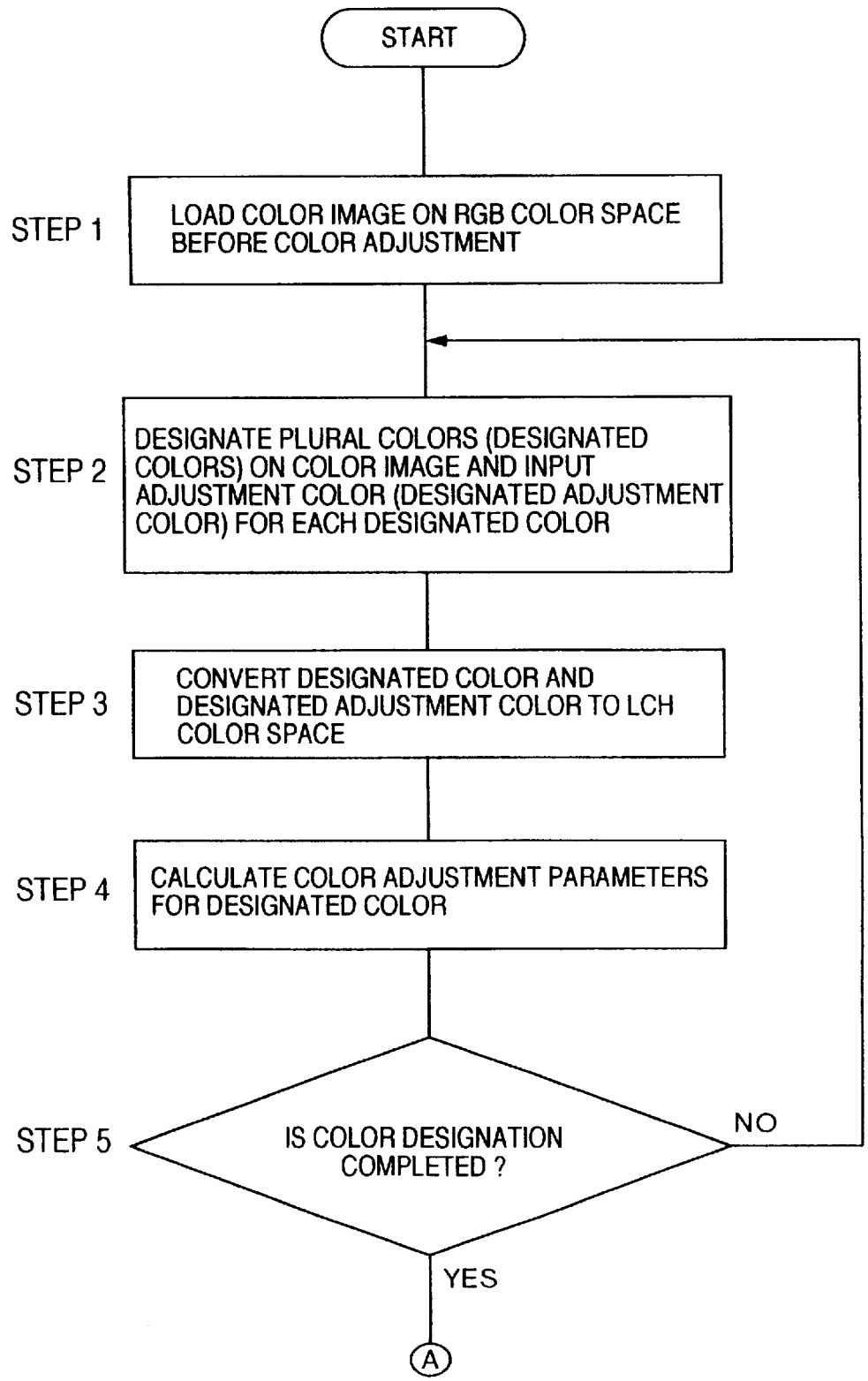
FIGS. 1 and 2 show, as a whole, a flow chart of a color adjustment method according to a first embodiment of the present invention.
Figure 2:
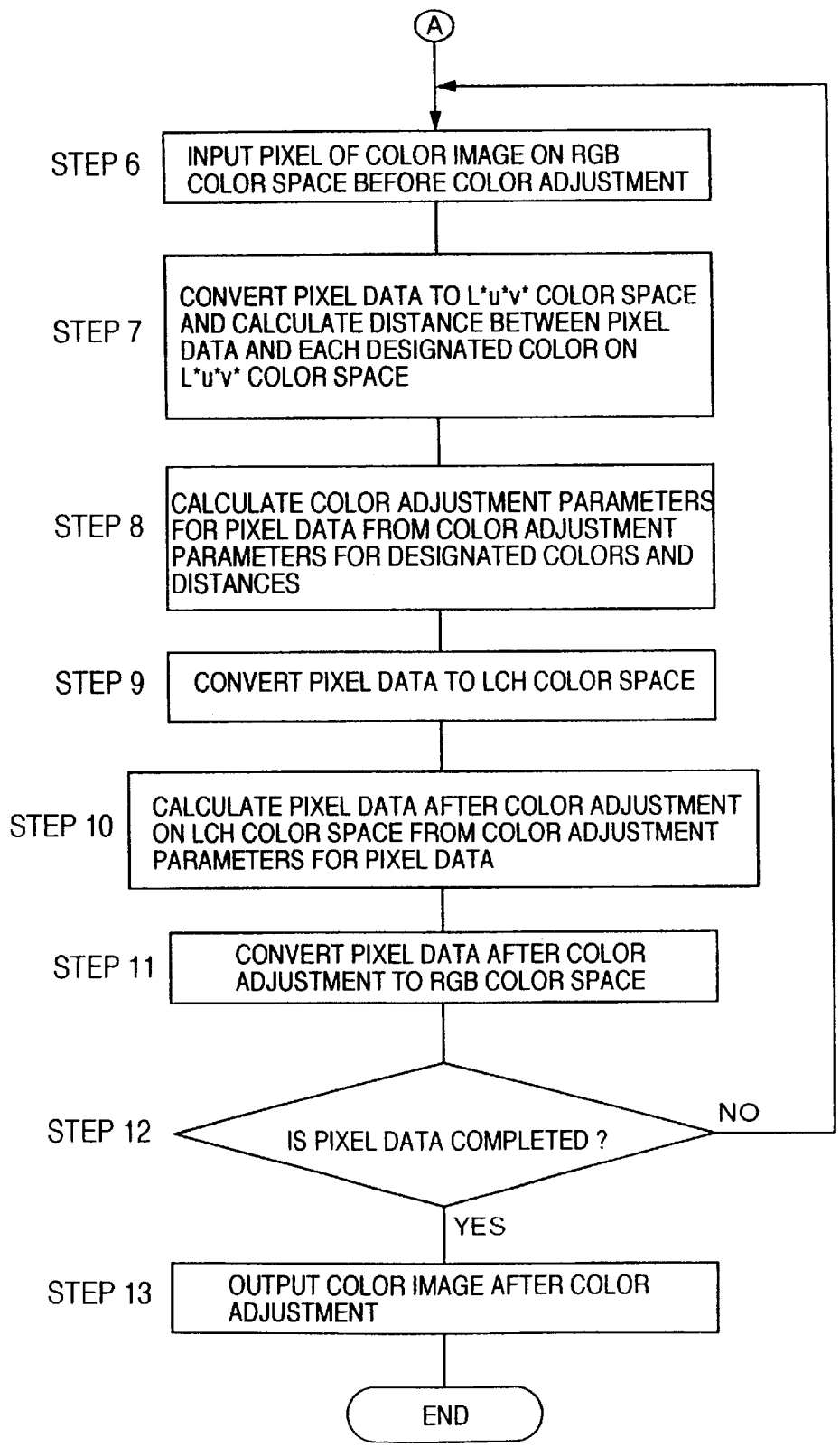
Figure 3:
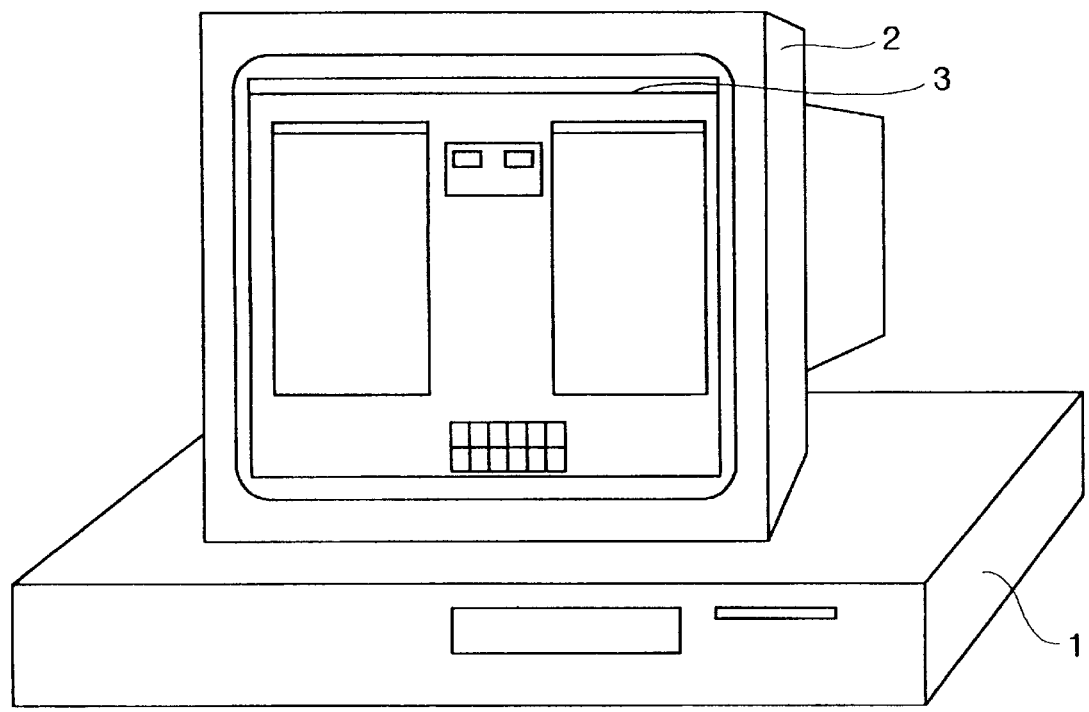
FIG. 3 is a view showing the construction of a color adjusting apparatus in the first embodiment of the present invention.
Figure 4:
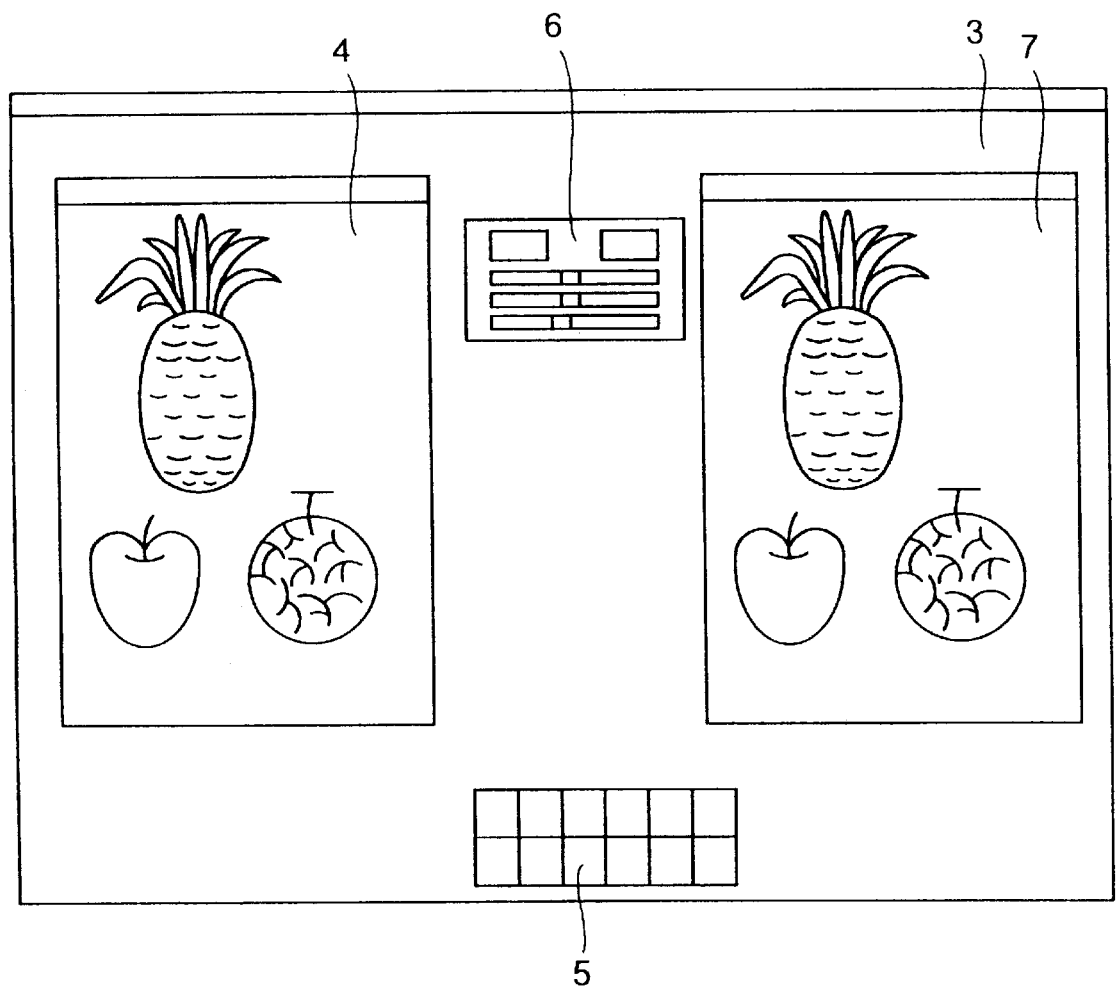
FIG. 4 is a diagram showing a color monitor screen in the first embodiment of the present invention.
Figure 5:
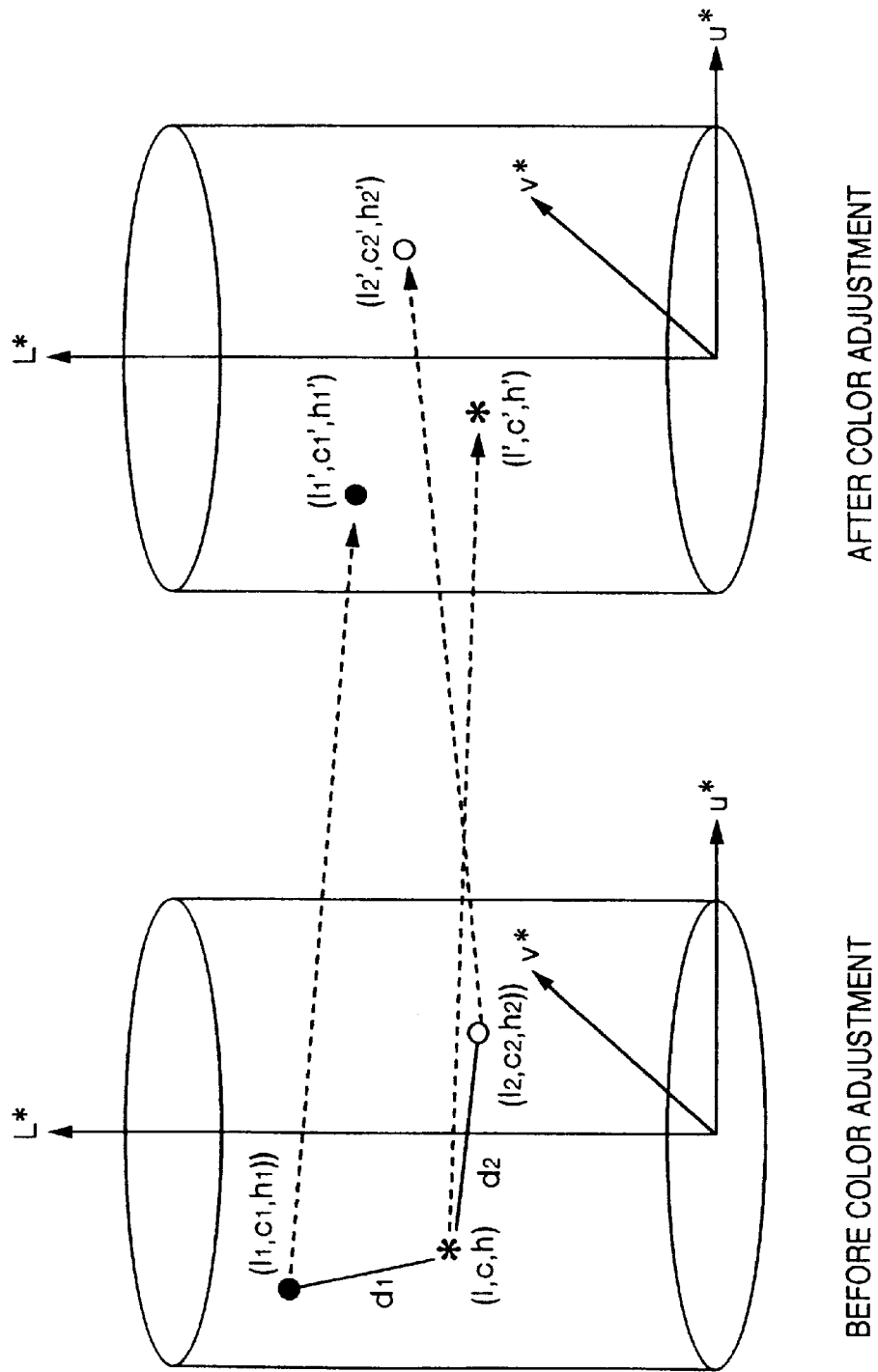
FIG. 5 is a diagram showing the concept of color adjustment in the first embodiment of the present invention.

Though color adjustment can be realized by dedicated hardware, the explanation in the following will be made in conjunction with the case where it is performed by software on a computer. FIGS. 1 and 2 show, as a whole, the flow of a color adjustment method according to the first embodiment of the present invention. The flow includes thirteen steps 1–13. FIG. 3 shows a computer system for performing color adjustment in the first embodiment. FIG. 4 shows the state of a screen of the computer when a software program for color adjustment is operated in the first embodiment. FIG. 5 is a diagram for explaining the calculation of color adjustment parameters in the first embodiment. The color adjustment method will now be explained in accordance with the flow chart shown in FIGS. 1 and 2 while referring to FIGS. 3–5.

The computer system shown in FIG. 3 is provided with a computer body 1 and a color monitor 2. Color adjustment software corresponding to a graphical user interface is activated on the computer body 1 so that a color adjustment software window 3 is displayed on the color monitor 2. Color image data on an RGB color space before color adjustment is loaded from a hard disk in the computer body 1 to a memory (step 1). Namely, the data is written into a video memory of the color monitor 2 and a color image 4 before color adjustment is displayed, as shown in FIG. 4. The color image is a 256-gradation image of 0 to 255 levels having 8 bits for each of R, G and B per one pixel and is an RGB signal which is free of γ correction in the NTSC standard of color television. Though the color image in the present embodiment is an image having 8 bits for each color on the RGB color space, the present invention is not limited to such an image. The color image may be an image on another color space.

On a screen of the color monitor 2, an operator for color adjustment designates a color (ri, gi, bi) on the color image 4 before color adjustment (or a designated color) and sets an adjustment color (ri', gi', bi') for the designated color (or a designated adjustment color) (step 2). The designated adjustment color may be selected from a color pallet 5 or may be set by changing the R, G and B levels of a designated-color window 6.

As shown in FIG. 5, the i-th designated color (ri, gi, bi) and the i-th designated adjustment color (ri', gi', bi') on the RGB color space are converted to a CIE-L* (luminosity) Cuv* (chroma)Huv° (hue) color space to obtain a designated color (li, ci, hi) and a designated adjustment color (li', ci', hi') (step 3).

The conversion from the RGB color space to a CIE-XYZ color space is represented by the following equation (1):

$$\left.\begin{array}{l}X = 1.5476R + 0.4424G + 0.5108B \\ Y = 0.7622R + 1.4958G + 0.2920B \\ Z = 0.0000R + 0.1686G + 2.8463B\end{array}\right\} \quad (1)$$

The conversion from the CIE-XYZ color space to a CIE-L*u*v*color space is represented by the following equation (2):

$$\left.\begin{array}{l}L^* = 116(Y/Yn)^{1/3} - 16 \\ u^* = 13L(u' - un') \\ v^* = 13L(v' - vn')\end{array}\right\} \quad (2)$$

where $u'$, $v'$, $un'$ and $vn'$ satisfy $$u' = 4X/(X + 15Y + 3Z)$$
$$v' = 9Y/(X + 15Y + 3Z)$$
$$un' = 4Xn/(Xn + 15Yn + 3Zn)$$
$$vn' = 9Yn/(Xn + 15Yn + 3Zn)$$

The conversion from the CIE-L*u*v*color space to the CIE-L*Cuv*Huv° color space is represented by the following equation (3):

$$\left.\begin{array}{l}L^* = L^* \\ Cuv^* = (u^* + v^*) \\ Huv° = \arctan(u^*/v^*)\end{array}\right\} \quad (3)$$

Though the conversion to the L*Cuv*Huv° color space is made in the shown example, the conversion to another color space is possible in accordance with the purpose of color adjustment, the adaptation to an image to be adjusted or the shortening of a calculation time. For simplification, the L*Cuv*Huv° color space will hereinafter be abbreviated as LCH color space.

Since the designated color (li, ui, vi) on the CIE-L*u*v*color space is to be used later on, it is stored.

Explanation will now be made of color adjustment parameters. Provided that any color before color adjustment and an adjustment color therefor are (l, c, h) and (l', c', h') on the LCH space shown in FIG. 5, color adjustment parameters α, β and γ are defined by the following equation (4):

$$\left.\begin{array}{l}\alpha = l'/l \\ \beta = c'/c \\ \gamma = h' - h\end{array}\right\} \quad (4)$$

The definition by equation (4) is made on the basis of a concept of eliminating the variations of black by the adjustment of luminosity L, eliminating the variations of achromatic color by the adjustment of chroma C and causing the uniform rotation of a hue circle by the adjustment of hue H. However, it is possible to use other color adjustment parameters in accordance with the purpose of color adjustment or an image to be adjusted.

From the designated color (li, ci, hi) and the designated adjustment color (li', ci', hi') on the LHC color space as defined in the above, color adjustment parameters αi (luminosity parameter), βi (chroma parameter) and γi (hue parameter) for the designated color are determined (step 4) in accordance with the definition by equation (4), as shown by the following equation (5):

$$\left.\begin{array}{l}\alpha i = li'/li \\ \beta i = ci'/ci \\ \gamma i = hi' - hi\end{array}\right\} \quad (5)$$

The judgement is made as to whether or not steps 2 to 4 are completed for all the designated colors (step 5). In the case of "completed", the flow goes to step 6. In the case of "not completed", the flow returns to step 2.

In step 6, pixel data (r, g, b) of the color image on the RGB space before color adjustment is inputted.

In step 7, the pixel data (r, g, b) of the color image on the RGB space is converted into data (l, u, v) on a CIE-L*u*v* color space in accordance with equations (1) and (2), and an Euclidean distance di to each designated color is calculated by the following equation (6):

$$di = \{(li-l)^2 + (ui-u)^2 + (vi-v)^2\}^{1/2} \quad (6)$$

In step 8, the luminosity parameter αi, chroma parameter βi and hue parameter γi for the designated color on the CIE-L*u*v* color space determined in step 4 and the distance di determined in step 7 are used to determine color adjustment parameters α (luminosity parameter), β (chroma parameter) and γ (hue parameter) for the pixel data, as shown by the following equation (7):

$$\left.\begin{array}{l}\alpha = \dfrac{\alpha 1 \cdot f(d1) + \ldots + \alpha n \cdot f(dn)}{f(d1) + \ldots + f(dn)} \\ \beta = \dfrac{\beta 1 \cdot f(d1) + \ldots + \beta n \cdot f(dn)}{f(d1) + \ldots + f(dn)} \\ \gamma = \dfrac{\gamma 1 \cdot f(d1) + \ldots + \gamma n \cdot f(dn)}{f(d1) + \ldots + f(dn)}\end{array}\right\} \quad (7)$$

where f(x) is selected as represented by the following equation (8):

$$f(x) = 1/x^2 \quad (8)$$

However, when x=0, f(x)= . Therefore, when di=0, the luminosity coefficient a is selected to α=αi as an exceptional processing. Since the color adjustment parameters in the vicinity of the designated color have a smooth change by virtue of such f(x), it is possible to realize preferable color adjustment.

In step 9, the pixel data (l, u, v) on the CIE-L*u*v* color space is converted into data (l, c, h) on the LCH color space in accordance with equation (3).

In step 10, pixel data (l', c', h') on the LCH color space after color adjustment is determined in accordance with equation (4) from the data (l, c, h) before color adjustment and the color adjustment parameters α, β and γ for the pixel, as shown by the following equation (9):

$$\left. \begin{array}{l} l' = \alpha l \\ c' = \beta c \\ h' = h + \gamma \end{array} \right\} \quad (9)$$

In step 11, the pixel data (l', c', h') on the LCH color space after color adjustment is converted to the RGB color space by inverse operations of equations (3), (2) and (1).

In step 12, a judgement is made as to whether or not steps 6 to 11 are completed for all pixels. In the case of "completed", the flow goes to step 13. In the case of "not completed", the flow returns to step 6.

In step 13, a color image after color adjustment is outputted to the color monitor 2 so that it is displayed on an after-adjustment image window 7. In the case where the operator for color adjustment performs color adjustment again, the flow returns to step 1.

The color adjustment is completed by the above steps, thereby obtaining a desired color image.

Next, a second embodiment of the present invention will be explained referring to FIGS. 6 to 11.

Though the above-mentioned first embodiment corresponds to a color adjustment method based on a color space including the R, G and B levels of a color image, the second embodiment corresponds to a color adjustment method based on a five-dimensional space into which the color space of a color image and the plane of the image are united. This color adjustment method can provide a further improved operability to an operator for color adjustment.

Figure 6:
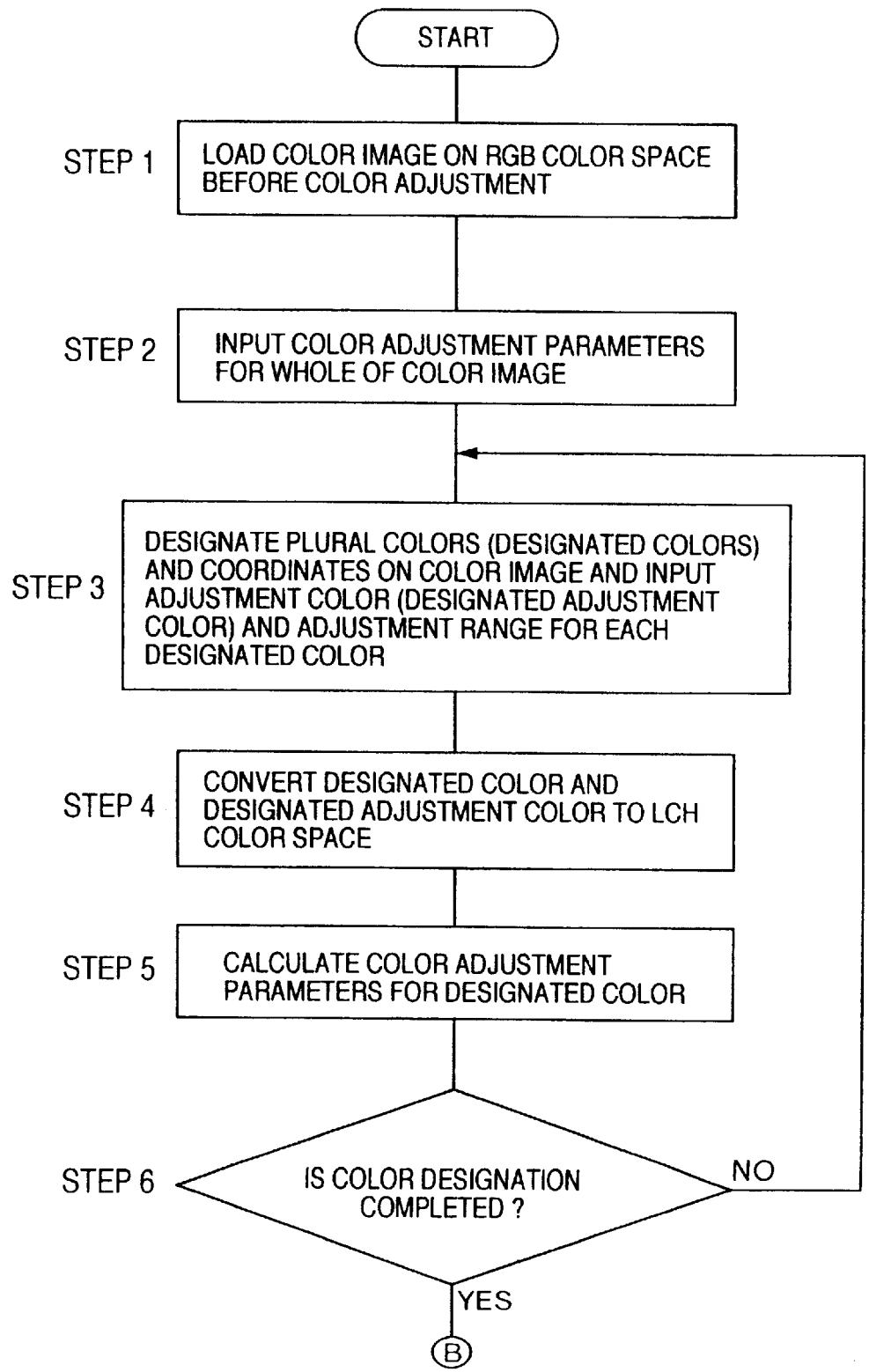
FIGS. 6, 7 and 8 show, as a whole, a flow chart of a color adjustment method according to a second embodiment of the present invention.
Figure 7:
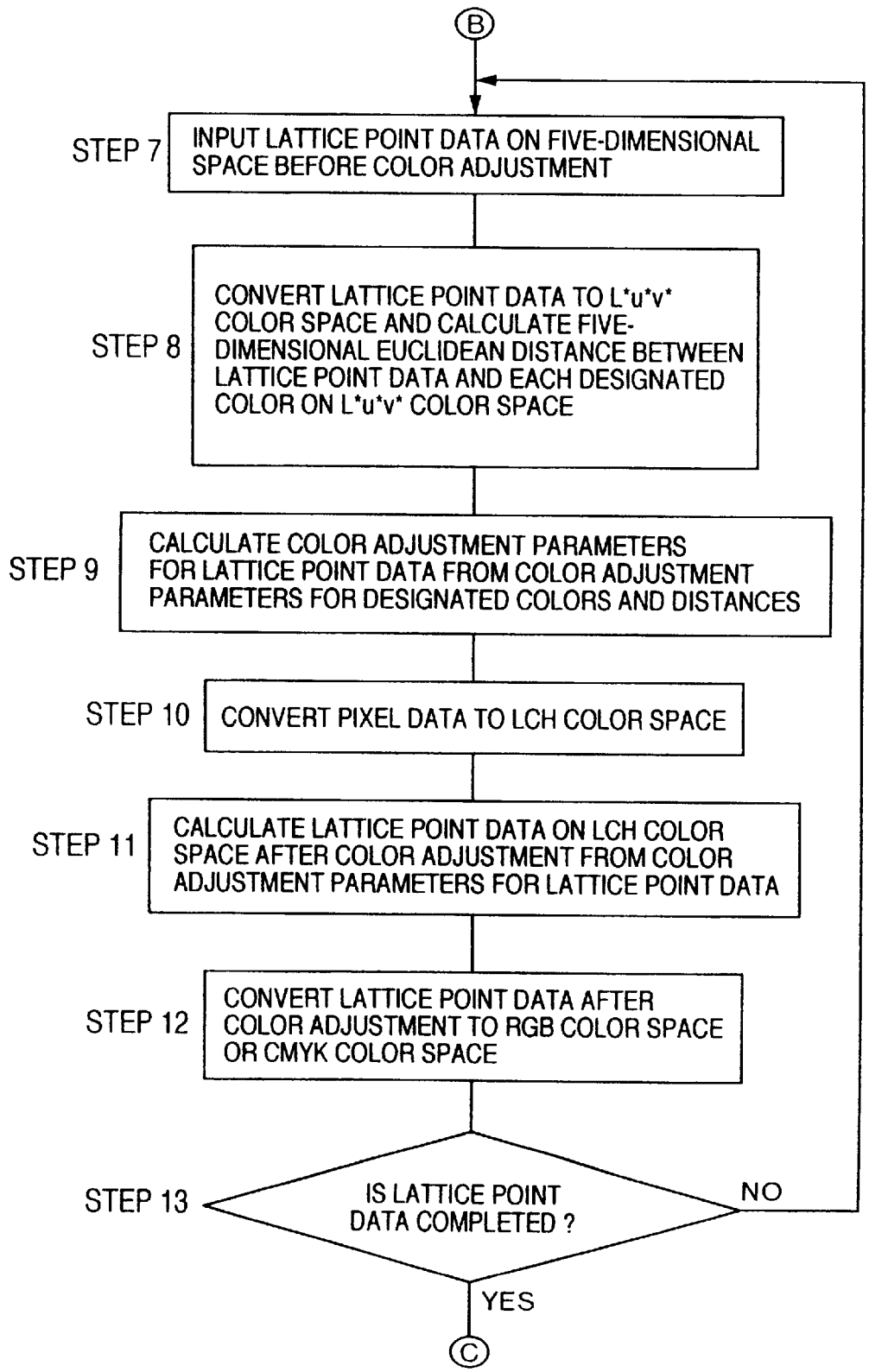
Figure 8:
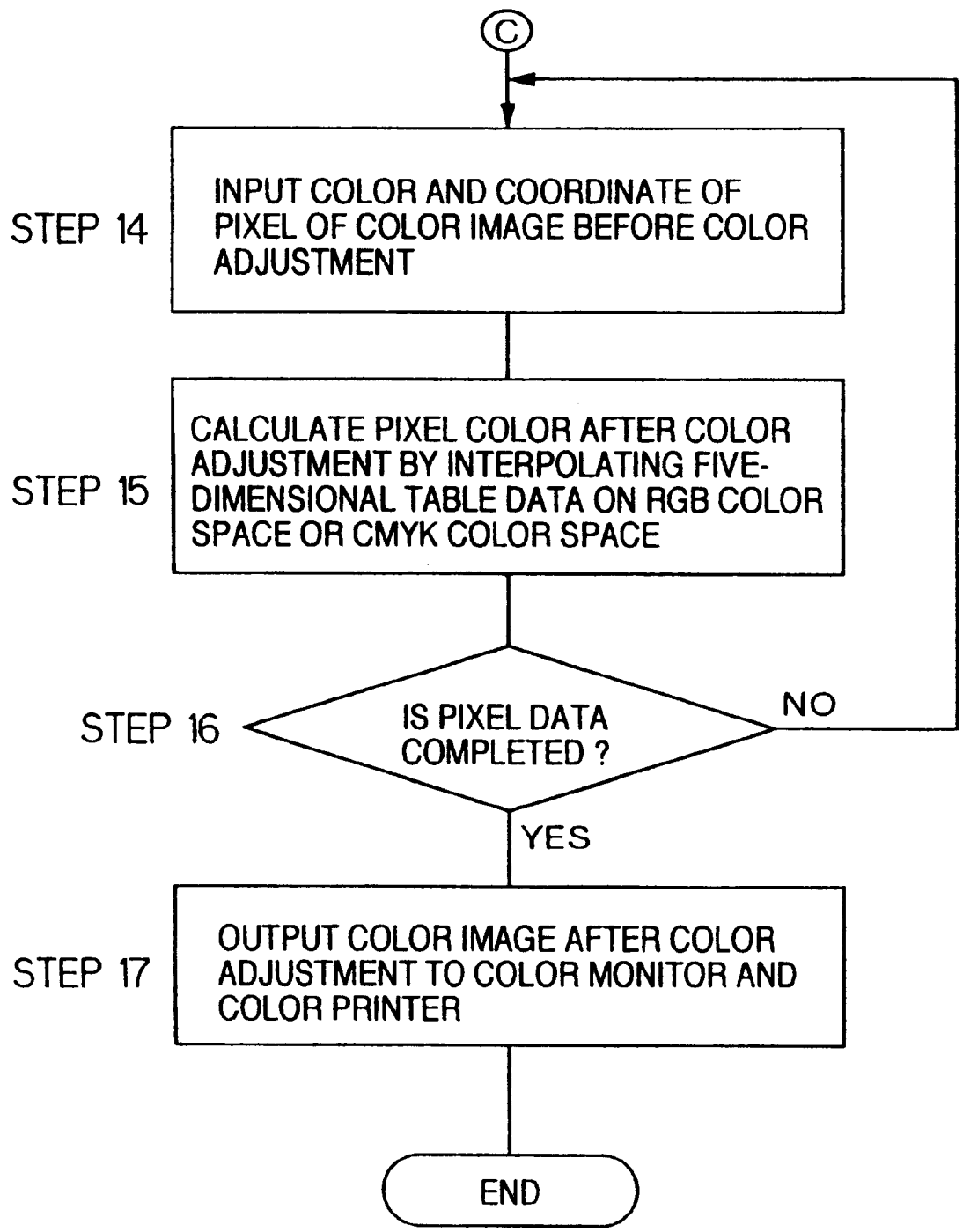
Figure 9:
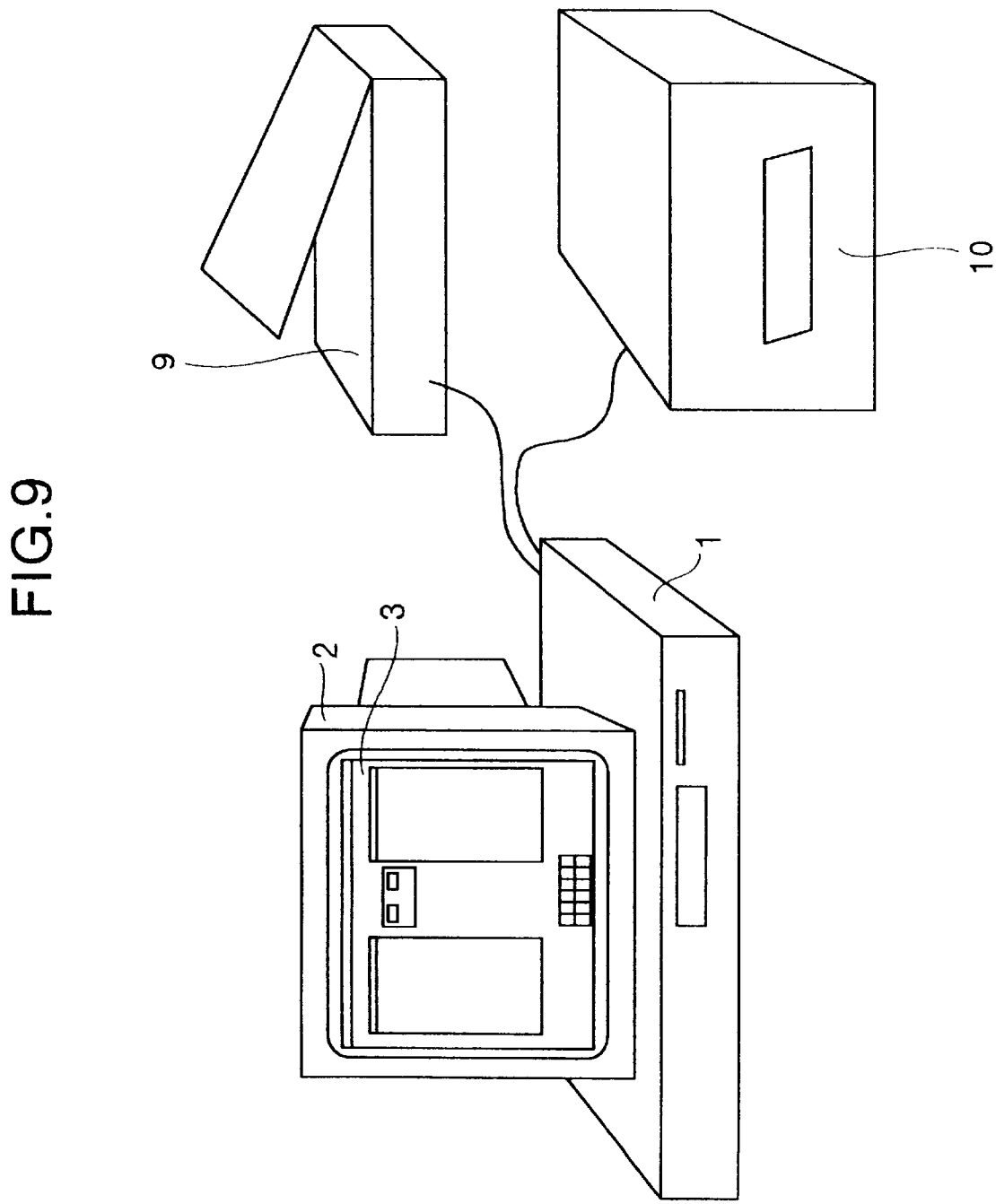
FIG. 9 is a view showing the construction of a color adjusting apparatus in the second embodiment of the present invention.

FIGS. 6, 7 and 8 show, as a whole, the flow of a color adjustment method according to the second embodiment of the present invention. The flow includes seventeen steps 1–17. FIG. 9 shows a computer system for performing color adjustment. The computer system has a construction in which an image inputting color scanner 9 and an image outputting color printer 10 are provided in addition to the system shown in FIG. 3.

Figure 10:
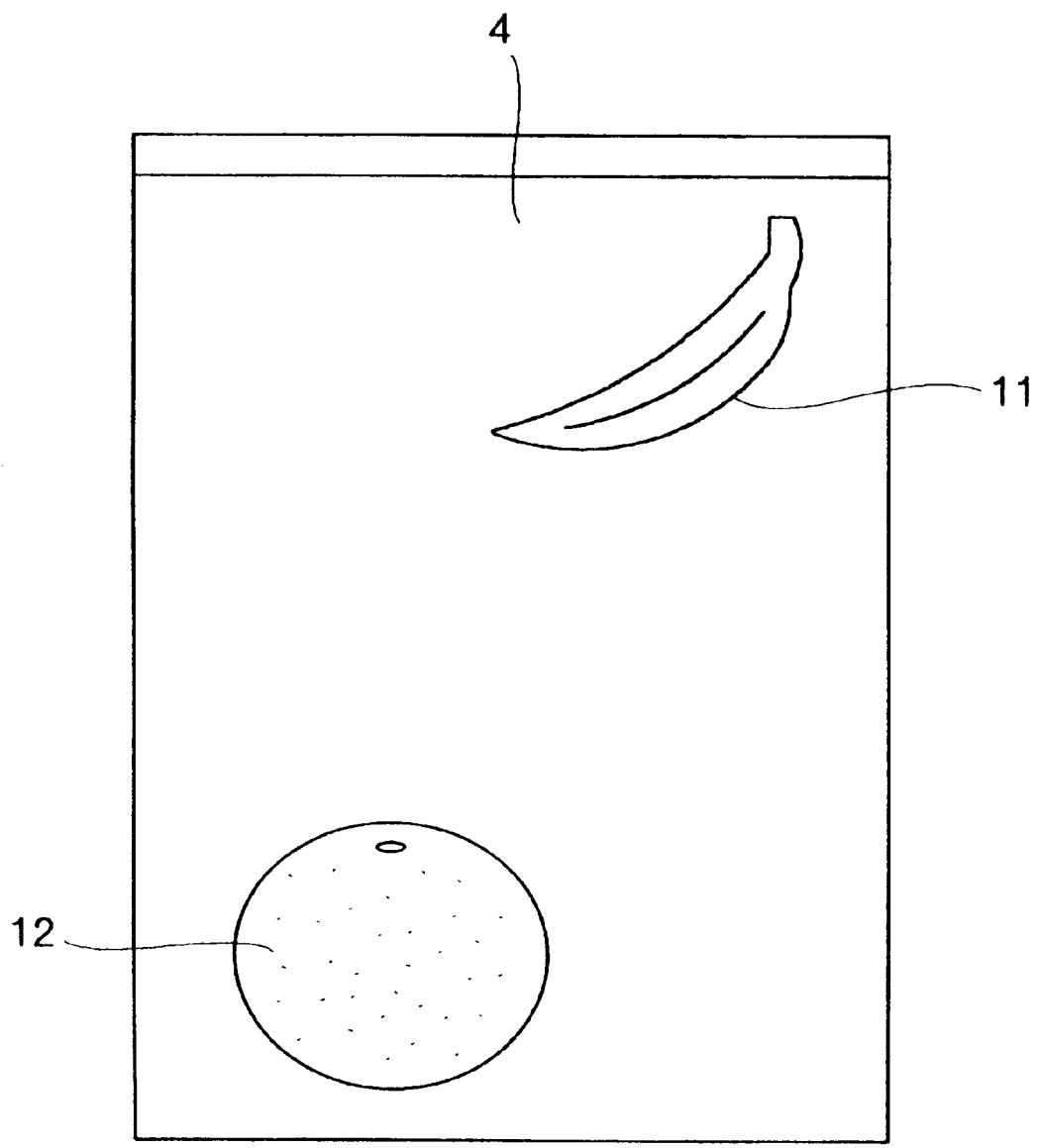
FIG. 10 is a diagram for explaining a color image before color adjustment in the second embodiment of the present invention.

FIG. 10 shows an example of an image before color adjustment which is suitable for explaining the second embodiment of the present invention. Referring to FIG. 10, a banana 11 and a summer orange 12 having the approximately same yellow are present on a before-adjustment image window 4.

Now consider that the color adjustment method according to the first embodiment of the present invention is applied in the case where the yellow of the banana 11 is designated and is subjected to color adjustment to greenish yellow while the yellow of the summer orange 12 is designated and is subjected to color adjustment to reddish yellow.

Though the yellows of the banana 11 and the summer orange 12 are naturally near to each other, they are color-adjusted toward different directions. Therefore, a slight change of a color in a range regarded as yellow may be subjected to large color adjustment, or in the case where a certain color in the banana 11 is near to the color of the summer orange 12, the corresponding color of the banana 11 may be subjected to color adjustment to a color near to an adjustment color for the summer orange 12. As a result, color adjustment desired by an operator for color adjustment is not realized.

Thus, the second embodiment provides a position change type color adjustment method in which not only a color space but also a position on an image plane are considered in performing color adjustment.

Figure 11:
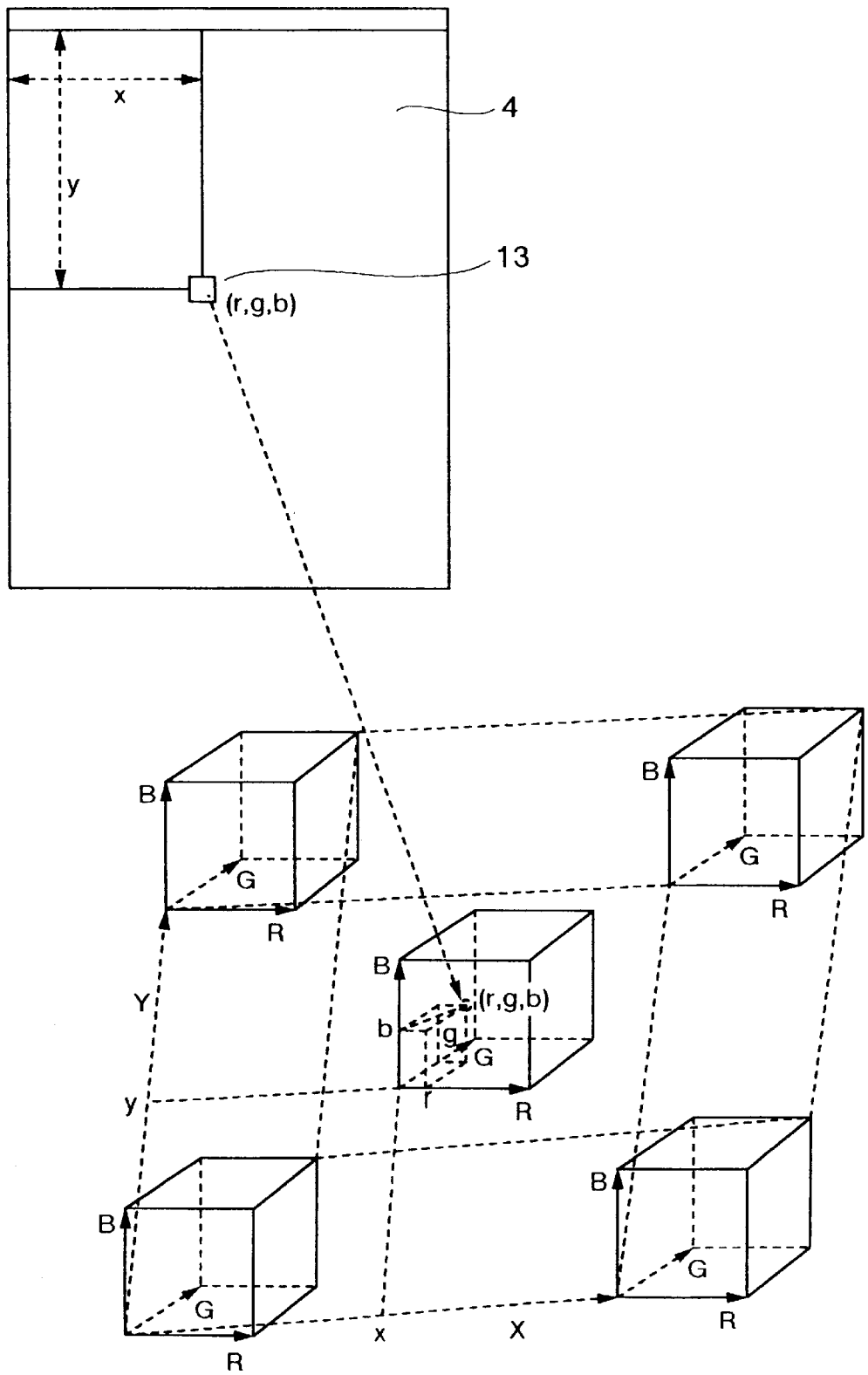
FIG. 11 is a diagram for explaining a five-dimensional space obtained by uniting a color space and an image plane in the second embodiment of the present invention.

The position change type color adjustment method is realized on a five-dimensional space into which the color space and the image plane are united. FIG. 11 shows this five-dimensional space. A five-dimensional space with R, G and B levels and X and Y coordinates taken as axes is considered for an image before color adjustment. When the RGB level of a pixel at a point (x, y) on an XY coordinate system on the plane of the image is (r, g, b), it is regarded as being positioned at a position shown in the lower portion of FIG. 11.

In the second embodiment, not only the color adjustment of a designated color but also the color adjustment as the whole of the color space can be performed simultaneously. Further, a color adjustment processing for the color image is realized at a high speed in such a manner that the color of lattice point data after color adjustment on the five-dimensional space including the RGB system and the XY system is determined and tabulated and an actual pixel (r, g, b, x, y) is determined by interpolation from the lattice point data table.

The color adjustment method according to the second embodiment will now be explained in accordance with the flow chart shown in FIGS. 6, 7 and 8.

Image data on an RGB color space before color adjustment is loaded from the color scanner 9 into a predetermined memory buffer (step 1). Namely, the data is written into a video memory of the color monitor 2 and is displayed on the before-adjustment image window 4, as shown in FIG. 10.

In step 2, an operator for color adjustment inputs color adjustment parameters α0 (luminosity parameter), β0 (chroma parameter) and γ0 (hue parameter) for the whole of a color image.

In step 3, the operator for color adjustment designates a color (ri, gi, bi) on the color image before color adjustment (or a designated color) and sets the coordinate (xi, yi) of the designated color and an adjustment color (ri', gi', bi') for the designated color (or a designated adjustment color).

Like step 3 in the first embodiment, the i-th designated color (ri, gi, bi) and the i-th designated adjustment color (ri', gi', bi') on the RGB color space are converted to a CIE-L* (luminosity) Cuv* (chroma) Huv° (hue) color space (step 4).

Like step 4 in the first embodiment, color adjustment parameters αi (luminosity parameter), βi (chroma parameter) and γi (hue parameter) for the designated color are determined from a designated color (li, ci, hi) and a designated adjustment color (li', ci', hi') on the LHC color space in accordance with the definition by equation (4) (step 5).

The judgement is made as to whether or not steps 3 to 5 are completed for all the designated colors (step 6). In the case of "completed", the flow goes to step 7. In the case of "not completed", the flow returns to step 3.

In the first embodiment of the present invention, pixel data of the color image is directly subjected to a color adjustment processing. In the second embodiment, however, a five-dimensional table interpolation method is used in order to perform the color adjustment processing at a high speed. According to the table interpolation method, the accurate level of a reference point (lattice point) after conversion is determined and data of an intermediate point is interpolated from the reference point. Though various methods are known for interpolation, the second embodiment uses fifth-order linear interpolation which is the extension of bilinear interpolation in a two-dimensional system.

In step 7, color data (rf, gf, bf) and coordinate data (xf, yf) of a lattice point on the RGB space before color adjustment are inputted. The lattice point data is determined at (0, 0, 0, 0, 0), (0, 0, 0, 0, 32), (0, 0, 0, 0, 64), - - - , (256, 256, 256, 256, 256).

The color data (rf, gf, bf) of the lattice point on the RGB space is converted into data (lf, uf, vf) on a CIE-L*u*v* color space by use of equations (1) and (2), and a five-dimensional Euclidean distance dfi (i=1, - - - , n) to each designated color is calculated, as shown by the following equation (10):

$$dfi=[(li-lf)^2+(ui-uf)^2+(vi-vf)^2+k\{(xi-xf)^2+(yi-yf)^2\}]^{1/2} \quad (10)$$

where k is a coefficient for matching the image plane distance with the color space.

In step 9, the color adjustment parameters $\alpha 0$, $\beta 0$ and $\gamma 0$ for the whole of the color image inputted in step 2, the color adjustment parameters $\alpha i$, $\beta i$ and $\gamma i$ for the designated color (li, ui, vi) (i=1, - - - , n) on the CIE-L*u*v* color space determined in step 5 and the distance dfi (i=1, - - - , n) determined in step 7 are used to determine color adjustment parameters $\gamma f$ (luminosity parameter), $\beta f$ (chroma parameter) and $\gamma f$ (hue parameter) for the pixel data, as shown by the following equation (11):

$$\alpha f = \frac{\alpha 0 + \alpha 1 \cdot f(q1/df1) + \ldots + \alpha n \cdot f(qn/dfn)}{1 + f(q1/df1) + \ldots + f(qn/dfn)}$$
$$\beta f = \frac{\beta 0 + \beta 1 \cdot f(q1/df1) + \ldots + \beta n \cdot f(qn/dfn)}{1 + f(q1/df1) + \ldots + f(qn/dfn)} \quad (11)$$
$$\gamma f = \frac{\gamma 0 + \gamma 1 \cdot f(q1/df1) + \ldots + \gamma n \cdot f(qn/dfn)}{1 + f(q1/df1) + \ldots + f(qn/dfn)}$$

In step 10, the pixel data (lf, uf, vf) on the CIE-L*u*v* color space is converted into data (lf, cf, hf) on the LCH color space in accordance with equation (3).

In step 11, pixel data (lf', cf', hf') on the LCH color space after color adjustment is determined in accordance with equation (4) from the data (lf, uf, vf) before color adjustment and the color adjustment parameters $\alpha f$, $\beta f$ and $\gamma f$ for the pixel, as shown by the following equation (12):

$$\left.\begin{array}{l} lf' = \alpha f \cdot lf \\ cf' = \beta f \cdot cf \\ hf' = hf + \gamma f \end{array}\right\} \quad (12)$$

In step 12, the pixel data (lf', cf', hf') on the LCH color space after color adjustment is converted to the RGB color space in accordance with inverse operations of equations (1)–(3).

In step 13, the judgement is made as to whether or not steps 7 to 12 are completed for all the pixels. In the case of "completed", the flow goes to step 14. In the case of "not completed", the flow returns to step 7.

In step 14, the color data (r, g, b) and coordinate (x, y) of a pixel of the color image on the RGB color space before color adjustment are inputted.

In order to interpolate a point (r, g, b, x, y)=(100, 142, 45, 33, 203) on the five-dimensional space into which the color space and the coordinate system are united, 32 data of (rf, gf, bf, xf, yf)=P1(96, 128, 32, 32, 192), P2(96, 128, 32, 32, 224), - - - , P32(128, 160, 64, 64, 224) are prepared as output lattice point data on the RGB or CMYK color space and the color R'G'B' of the pixel after color adjustment is outputted by performing a five-dimensional table interpolation processing (step 15) in accordance with the lower 5-bit data ($\Delta r=4$, $\Delta g=14$, $\Delta b=13$, $\Delta x=1$, $\Delta y=11$) of r, g, b, x and y and the following equation (13):

$$\left.\begin{array}{l} P33' = \{(32-\Delta y)P1' + \Delta y \cdot P2'\}/32 \\ P34' = \{(32-\Delta y)P3' + \Delta y \cdot P4'\}/32 \\ P35' = \{(32-\Delta y)P5' + \Delta y \cdot P6'\}/32 \\ P36' = \{(32-\Delta y)P7' + \Delta y \cdot P8'\}/32 \\ P37' = \{(32-\Delta y)P9' + \Delta y \cdot P10'\}/32 \\ P38' = \{(32-\Delta y)P11' + \Delta y \cdot P12'\}/32 \\ P39' = \{(32-\Delta y)P13' + \Delta y \cdot P14'\}/32 \\ P40' = \{(32-\Delta y)P15' + \Delta y \cdot P16'\}/32 \\ P41' = \{(32-\Delta y)P17' + \Delta y \cdot P18'\}/32 \\ P42' = \{(32-\Delta y)P19' + \Delta y \cdot P20'\}/32 \\ P43' = \{(32-\Delta y)P21' + \Delta y \cdot P22'\}/32 \\ P44' = \{(32-\Delta y)P23' + \Delta y \cdot P24'\}/32 \\ P45' = \{(32-\Delta y)P25' + \Delta y \cdot P26'\}/32 \\ P46' = \{(32-\Delta y)P27' + \Delta y \cdot P28'\}/32 \\ P47' = \{(32-\Delta y)P29' + \Delta y \cdot P30'\}/32 \\ P48' = \{(32-\Delta y)P31' + \Delta y \cdot P32'\}/32 \\ P49' = \{(32-\Delta x)P33' + \Delta x \cdot P34'\}/32 \\ P50' = \{(32-\Delta x)P35' + \Delta x \cdot P36'\}/32 \\ P51' = \{(32-\Delta x)P37' + \Delta x \cdot P38'\}/32 \\ P52' = \{(32-\Delta x)P39' + \Delta x \cdot P40'\}/32 \\ P53' = \{(32-\Delta x)P41' + \Delta x \cdot P42'\}/32 \\ P53' = \{(32-\Delta x)P43' + \Delta x \cdot P44'\}/32 \\ P55' = \{(32-\Delta x)P45' + \Delta x \cdot P46'\}/32 \\ P56' = \{(32-\Delta x)P47' + \Delta x \cdot P48'\}/32 \\ P57' = \{(32-\Delta b)P49' + \Delta b \cdot P50'\}/32 \\ P58' = \{(32-\Delta b)P51' + \Delta b \cdot P52'\}/32 \\ P59' = \{(32-\Delta b)P53' + \Delta b \cdot P54'\}/32 \\ P60' = \{(32-\Delta b)P55' + \Delta b \cdot P56'\}/32 \\ P61' = \{(32-\Delta g)P57' + \Delta g \cdot P58'\}/32 \\ P62' = \{(32-\Delta g)P59' + \Delta g \cdot P60'\}/32 \\ P33' = \{(32-\Delta y)P1' + \Delta y \cdot P2'\}/32 \\ P' = \{(32-\Delta r)P61' + \Delta r \cdot P62'\}/32 \end{array}\right\} \quad (13)$$

In step 16, the judgement is made as to whether or not steps 14 and 15 are completed for all pixels. In the case of "completed", the flow goes to step 17. In the case of "not completed", the flow returns to step 14.

A color image after color adjustment is outputted to the color monitor 2. In the case where the operator for color adjustment performs color adjustment again, the flow returns to step 1. Confirming that the color adjustment is satisfactory, the color image after color adjustment is outputted to the color printer 10 to obtain a color hard copy (step 17).

Though the explanation of the second embodiment is completed in the foregoing, it should be noted that the color adjustment method of the present invention can be applied on a multi-dimensional space into which a color space and the space and time axes of an image are united. As examples of such a multi-dimensional space can be considered a six-dimensional space into which an RGB color space and the space XYZ of a three-dimensional image are united, a four-dimensional space into which an RGB color space and time T are united, a six-dimensional space into which an RGB color space and the plane XY and time T of an image are united, and a seven-dimensional space into which an RGB color space and the space XYZ and time T of a three-dimensional image are united. When those spaces are used, a distance dfi between a color (lf, uf, vf) to be processed and a designated color (li, ui, vi) is represented by the following equations (14), (15), (16) and (17):

$$dfi=[(li-lf)^2+(ui-uf)^2+(vi-vf)^2$$
$$+k\{(xi-xf)^2+(yi-yf)^2+(zi-zf)^2\}]^{1/2} \quad (14)$$

$$dfi=[(li-lf)^2+(ui-uf)^2+(vi-vf)^2$$
$$+m(ti-tf)^2]^{1/2} \quad (15)$$

$$dfi=[(li-lf)^2+(ui-uf)^2+(vi-vf)^2$$
$$+k\{(xi-xf)^2+(yi-yf)^2\}+m(ti-tf)^2]^{1/2} \quad (16)$$

$$dfi=[(li-lf)^2+(ui-uf)^2+(vi-vf)^2$$
$$+k\{(xi-xf)^2+(yi-yf)^2+(zi-zf)^2\}$$
$$+m(ti-tf)^2]^{1/2} \quad (17)$$

where k and m are coefficients for matching the space distance and time distance of the image with the color space, respectively.

As will be apparent from the foregoing explanation, the present invention enables the realization of simple and easy color adjustment by a color adjustment processing based on a distance on a multi-dimensional space including a color space.

What is claimed is:

1. A color adjustment method of performing a color adjustment of a color image, said color image being represented on a first color space, comprising the steps of:

inputting first designated colors of said color image, said first designated colors being represented on said first color space;

inputting first designated-adjustment-colors for said first designated colors, said first designated-adjustment-colors being represented on said first color space;

converting said first designated colors and said first designated-adjustment-colors to second designated colors and second designated-adjustment colors, respectively, said second designated colors and said second designated-adjustment-colors being represented on a second color space;

determining first color adjustment parameters for said first designated colors based on said second designated colors and said second designated-adjustment-colors;

inputting first pixel colors of said color image, said first pixel colors being represented on said first color space;

converting said first designated colors and said first pixel colors to third designated colors and second pixel colors, respectively, said third designated colors and said second pixel colors being represented on a third color space;

determining distances between said second pixel colors and said third designated colors;

determining second color adjustment parameters for said first pixel colors based on said first color adjustment parameters and said distances;

converting said second pixel colors to third pixel colors which are represented on said second color space;

determining first color-adjusted pixel colors based on said second color adjustment parameters and said third pixel colors; and converting said first color-adjusted pixel colors to second color-adjusted pixel colors which are represented on said first color space.

2. A color adjustment method according to claim 1, wherein said color image is a color motion image.

3. A color adjustment method according to claim 1, wherein said color image is a three-dimensional color image.

4. A color adjustment method according to claim 1, wherein said first designated-adjustment-colors provide a range of adjustment for said first designated colors.

5. A color adjustment method according to claim 1, wherein said first color space is a color space including three additive primary colors of red, green and blue.

6. A color adjustment method according to claim 1, wherein said second color space is a color space including luminosity, chroma and hue.

7. A color adjustment method according to claim 1, wherein said third color space is a color space including luminosity and two chromaticities.

8. A color adjustment method according to claim 1, wherein said distances are three-dimensional Euclidean distances on said third color space.

9. A color adjustment method according to claim 1, wherein said distances are five-dimensional Euclidean distances on a five-dimensional space into which said third color space and a plane of said color image are united.

10. A color adjustment method according to claim 1, wherein said second color adjustment parameters are determined based on said first color adjustment parameters and said distances by the following interpolation equation:

$$S=\{(S1 \cdot f(d1)+ \cdots +Sn \cdot f(dn)\}/\{f(d1)+ \cdots +f(dn)\}$$

where Si (i=1, - - - , n) represents said second color adjustment parameters, di represents said distances, and f(x) (x≧0) is a weighting function.

11. A color adjustment method of performing a color adjustment of a color image, said color image being represented on a first color space, comprising the steps of:

(a) inputting first designated colors of said color image, said first designated colors being represented on said first color space;

(b) inputting first designated-adjustment-colors for said first designated colors;

(c) converting said first designated colors and said first designated-adjustment-colors to second designated colors and second designated-adjustment-colors, respectively, said second designated colors and said second designated-adjustment-colors being represented on a second color space;

(d) determining first color adjustment parameters for said first designated colors based on said second designated colors and said second designated-adjustment-colors;

(e) inputting first pixel colors of pixels in said color image, said first pixel colors being represented on said first color space;

(f) converting said first designated colors and said first pixel colors to third designated colors and second pixel colors, respectively, said third designated colors and said second pixel colors being represented on a third color space;

(g) determining distances between said second pixel colors and said third designated colors;

(h) determining second color adjustment parameters for said first pixel colors based on said first color adjustment parameters and said distances;

(i) converting said second pixel colors to third pixel colors which are represented on said second color space;

(j) determining first color-adjusted pixel colors of said pixels based on said second color adjustment parameters and said first pixel colors;

(k) converting said first color-adjusted pixel colors to second color-adjusted pixel colors which are represented on a fourth color space; and (l) repeating from step (e) to step (k) for every pixel of said color image.

12. A color adjustment method according to claim 11, wherein said color image is a color motion image.

13. A color adjustment method according to claim 11, wherein said color image is a three-dimensional color image.

14. A color adjustment method according to claim 11, wherein said first designated-adjustment-colors provide a range of adjustment for said first designated colors.

15. A color adjustment method according to claim 11, wherein said first color space is a color space including three additive primary colors of red, green and blue.

16. A color adjustment method according to claim 11, wherein said second color space is a color space including luminosity, chroma and hue.

17. A color adjustment method according to claim 11, wherein said third color space is a color space including luminosity and two chromaticities.

18. A color adjustment method according to claim 11, wherein said fourth color space is a color space including three additive primary colors of red, green and blue, a color space including three subtractive primary colors of cyan, magenta and yellow, or a color space including four subtractive primary colors of cyan, magenta, yellow and black.

19. A color adjustment method according to claim 11, wherein said distances are three-dimensional Euclidean distances on said third color space.

20. A color adjustment method according to claim 11, wherein said second color adjustment parameters (S) are determined based on said first color adjustment parameters (Si, where i=1, - - - , n) and said distances (di) by the following interpolation equation:

$$S=\{S1f(d1)+ \text{ - - - } +Sn\cdot f(dn)\}/\{f(d1)+ \text{ - - - } +f(dn)\}$$

where f(x) (x≧0) is a weighting function.

21. A color adjustment method according to claim 11, wherein said first pixel colors include three-dimensional chromaticity information or said first color space.

22. A color adjustment method according to claim 11, wherein said first pixel colors include three-dimensional chromaticity information on said first color space and image plane coordinate information of said color image.

23. A color adjustment method according to claim 11, wherein step (k) is conducted using a multi-dimensional table interpolation method and said first color-adjusted pixel colors are data of a multi-dimensional table.

24. A color adjustment method, comprising:

(a) displaying a colored image that is represented on a first color space;

(b) designating a plurality of designated colors in the colored image for adjustment;

(c) for each designated color, selecting a corresponding designated-adjustment color that is represented on the first color space;

(d) converting the designated colors and the corresponding designated-adjustment colors to a second color space;

(e) determining first color adjustment parameters from representations of the designated colors and the designated-adjustment colors in the second color space;

(f) converting the colored image and the designated colors to a third color space;

(g) determining distances, in the third color space, between pixel colors of the colored image and the designated colors;

(h) finding second color adjustment parameters from the distances and the first color adjustment parameters; and (i) using the second color adjustment parameters to adjust the pixel colors.

25. A color adjustment method according to claim 24, wherein the colored image is displayed on a screen in step (a), and wherein step (b) comprises selecting the designated colors from a color pallet that is also displayed on the screen.

26. A color adjustment method according to claim 24, wherein the colored image is displayed on a screen in step (a), and wherein step (b) is conducted using a designated color window that is also displayed on the screen.

27. A color adjustment method according to claim 24, wherein the colored image is displayed on a screen in step (a), and further comprising displaying the colored image on the screen using the adjusted pixel colors.

28. A color adjustment method according to claim 24, wherein the first color space has a red dimension, a green dimension, and a blue dimension, wherein the second color space has a luminosity dimension, a chroma dimension, and a hue dimension, and wherein the third color space has a luminosity dimension and two chromaticity dimensions.

* * * * *